United States Patent [19]

Frosig et al.

[11] Patent Number: 5,146,256
[45] Date of Patent: Sep. 8, 1992

[54] CLOSE-UP ATTACHMENT FOR SINGLE-USE CAMERA

[75] Inventors: Peter A. Frosig; Roman Lucyszyn, both of Rochester, N.Y.

[73] Assignee: Eastman Kodak Company, Rochester, N.Y.

[21] Appl. No.: 656,917

[22] Filed: Feb. 19, 1991

[51] Int. Cl.$^5$ .............................................. G03B 11/00
[52] U.S. Cl. ................................................. 354/295
[58] Field of Search .................. 354/195.12, 199, 219, 354/295, 296

[56] References Cited

U.S. PATENT DOCUMENTS

| | | | |
|---|---|---|---|
| 1,828,541 | 10/1931 | Meletio | 354/295 |
| 2,674,932 | 4/1954 | Tydings et al. | 354/295 |
| 3,253,528 | 5/1966 | Bing | 354/295 |
| 3,636,342 | 1/1972 | Blount | 354/295 |
| 3,738,238 | 6/1973 | Hager | 354/295 |
| 4,219,264 | 8/1980 | Rodick | 354/162 |
| 4,801,957 | 1/1989 | Vandemoere | 354/147 |
| 4,903,058 | 2/1990 | Schappler | 354/145.1 |
| 4,973,998 | 11/1990 | Gates | 354/145.1 |

FOREIGN PATENT DOCUMENTS

| | | | |
|---|---|---|---|
| 50-23296 | 7/1975 | Japan | 354/295 |
| 1423730 | 2/1976 | United Kingdom | 354/295 |
| 1568206 | 8/1976 | United Kingdom | 354/295 |

OTHER PUBLICATIONS

RD16551-Research Disclosure-Brauning-Jan. 1978.
RD16552-Research Disclosure-Ort-Jan. 1978.

*Primary Examiner*—L. T. Hix
*Assistant Examiner*—Howard B. Blankenship
*Attorney, Agent, or Firm*—Roger A. Fields

[57] ABSTRACT

A close-up attachment, including a close-up accessory lens and a corresponding finder lens, is attached to a single-use camera by means of a plug-like insert which is manually positioned in an open viewfinder tunnel of the camera.

6 Claims, 2 Drawing Sheets

CLOSE-UP ATTACHMENT FOR SINGLE-USE CAMERA

BACKGROUND OF THE INVENTION

1. Field of the Invention

The invention relates generally to the field of photography, and in particular to a close-up attachment for a camera.

2. Description of the Prior

Recently, a disposable single-use 35 mm camera referred to as the "Quick Snap" was introduced by Fuji Photo Film Co. Ltd., and another disposable single-use 35 mm camera referred to as the "Fling 35" was introduced by Eastman Kodak Co. Generally, each disposable camera is a point-and-shoot type and comprises (1) a plastic inner camera shell which houses a fixed-focus taking lens, a film metering mechanism and a shutter, and (2) a paper-cardboard outer sealed pack which contains the inner camera shell and has respective openings for the taking lens and for a shutter release button, a frame counter window, a film advance thumbwheel and a simple see-through viewfinder provided on the inner camera shell. At the manufacturer, the inner camera shell is loaded with a conventional 24-exposure 35 mm film cartridge, and substantially the entire length of the unexposed filmstrip is factory prewound from the cartridge into a supply chamber of the camera shell. After the customer takes a picture, the thumbwheel is manually rotated to rewind the exposed frame into the cartridge. The rewinding movement of the filmstrip the equivalent of one frame rotates a metering sprocket to decrement a frame counter to its next lower numbered setting. When substantially the entire length of the filmstrip is exposed and rewound into the cartridge, the single-use camera is sent to a photofinisher who first removes the inner camera shell from the outer sealed pack and then removes the filmstrip from the camera shell. The filmstrip is processed, and the camera shell is recycled.

More particularly, commonly assigned U.S. Pat. No. 4,801,957, issued Jan. 31, 1989, and U.S. Pat. No. 4,903,058, issued Feb. 20, 1990, and U.S. Pat. No. 4,973,998, issued Nov. 27, 1990, each disclose a disposable single-use 35 mm camera of the type wherein an inner camera shell is pre-loaded with film and includes a taking lens, and an outer sealed pack contains the camera shell and has an opening for the taking lens. The inner camera shell has flash synchronization access ports and the outer sealed pack is constructed of a perforable material which overlays the access ports. An accessory re-usable electronic flash unit intended for use with the disposable camera includes electrically conductive flash synchronization pins shaped to perforate the outer sealed pack to enter the access Ports, whereby the flash unit is removably connected to the inner camera shell.

SUMMARY OF THE INVENTION

According to the invention, an accessory attachment for use during picture-taking with a camera which has an open viewfinder tunnel, is characterized in that:

attachment means is configured for manual insertion into the open viewfinder tunnel to secure the attachment means to the camera; and accessory means is connected to the attachment means for use during picture-taking when the attachment means is secured to the camera. Preferably, the attachment means includes a plug-like insert sized and shaped to substantially fill the open viewfinder tunnel when the attachment means is secured to the camera.

The invention may also take the form of a photographic combination of a single-use camera having an empty open-ended viewfinder tunnel, and an accessory attachment for use during picture-taking with the camera, characterized in that:

said accessory attachment includes attachment means configured to be manually inserted into an open end of the viewfinder tunnel for securing the attachment means in a fixed relation to the camera, and accessory means connected to the attachment means for use during picture-taking only when the attachment means is secured in the fixed relation to the camera.

In a preferred embodiment, the invention comprises a close-up attachment, including a close-up accessory lens and a corresponding finder lens, that is attached to a single-use camera by means of a plug-like insert which is manually Positioned in an open viewfinder tunnel of the camera.

DETAILED DESCRIPTION OF THE PREFERRED EMBODIMENT

The invention is disclosed in connection with a 35 mm camera. Because such a camera is widely known, this description is directed in particular to photographic elements forming part of or cooperating directly with the invention. It is to be understood, however, that other elements not specifically shown or described may take various forms known to persons of ordinary skill in the art.

Figure 1:
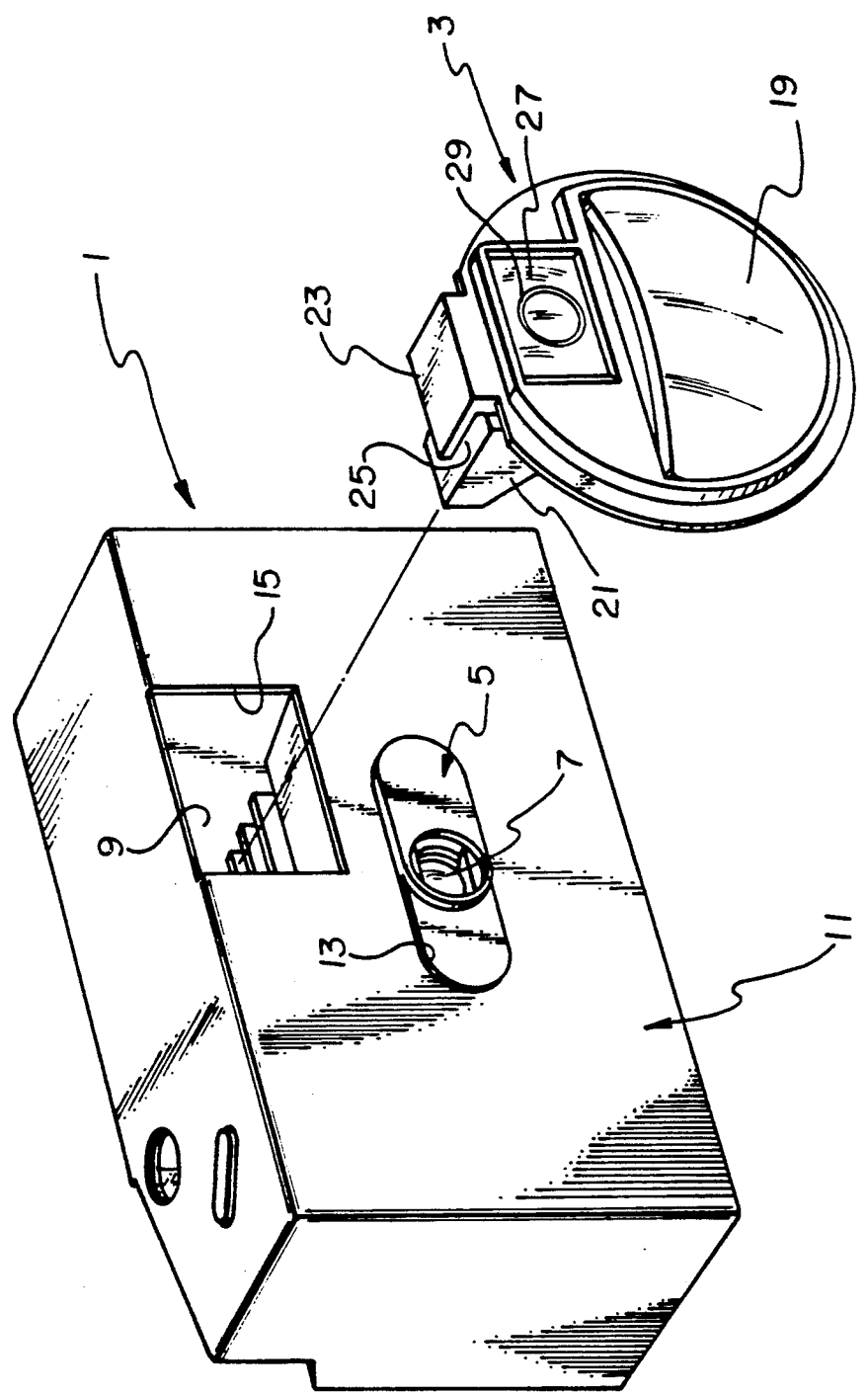
FIG. 1 is a front perspective view of a disposable single-use camera and a close-up attachment, according to a preferred embodiment of the invention.
Figure 2:
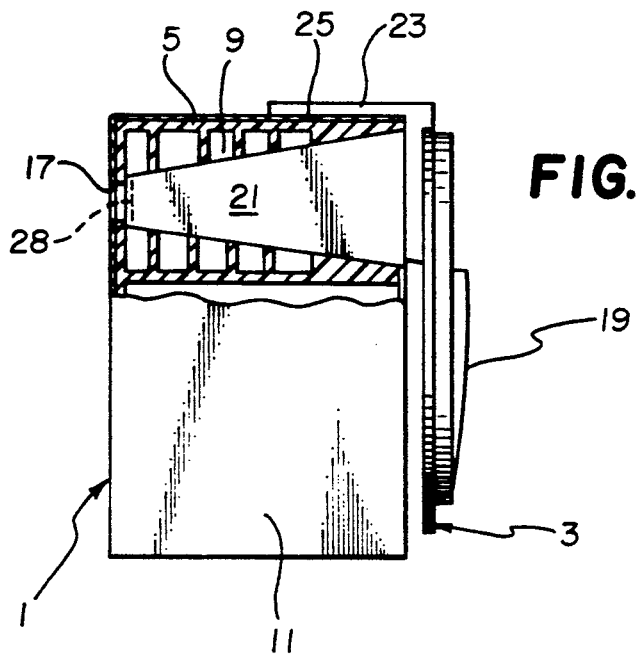
FIG. 2 is a side elevation view partly in section of the camera and the close-up attachment.

Referring now to the drawings, FIGS. 1 and 2 depict a disposable single-use camera 1 and a close-up attachment 3. The single-use camera 1 is a point-and-shoot type and comprises (1) an inner camera shell 5 which houses a fixed-focus taking lens 7 and includes an open-ended see-through viewfinder tunnel 9, and (2) an outer sealed pack 11 which contains the inner camera shell and has respective front openings 13 and 15 for the taking lens and the viewfinder tunnel and a separate rear opening 17 for the viewfinder tunnel. Further details of the single-use camera 1 are disclosed in commonly assigned U.S. Pat. Nos. 4,801,957, issued Jan. 31, 1989, 4,903,058, issued Feb. 20, 1990, and 4,973,998, issued Nov. 7, 1990.

The close-up attachment 3 includes a close-up accessory (taking) lens 19 and a transparent plastic or glass plug-like insert 21. The insert 21 is hollow, and is sized and shaped to substantially fill the viewfinder tunnel 9 when the insert is manually pushed into the viewfinder tunnel through the front opening 15 in the outer pack 11. A stabilizer piece 23 is integrally formed with the insert 21 to provide a relative narrow space 25 between the two for locating the stabilizer piece along the top exterior of the outer pack 11 when the insert is positioned in the viewfinder tunnel 9. See FIG. 2. A pair of front and rear finder lenses 27 and 28 are secured to the insert 21, and have optical properties corresponding to the close-up lens 19 to enable a photographer to see a close-up image of a subject (to be photographed) similar to the one seen through the close-up lens and the main taking lens 7. See FIGS. 1 and 2.

To use the close-up attachment 3, its insert 21 must be manually pushed into the viewfinder tunnel 9 until the close-up lens 19 is located immediately in front of the main taking lens 7 and the front finder lens 27 is located immediately in front of the viewfinder tunnel. See FIG. 2. At this time, the close-up attachment 3 generally is secured in a fixed relation to the single-use camera 1.

Figure 3:
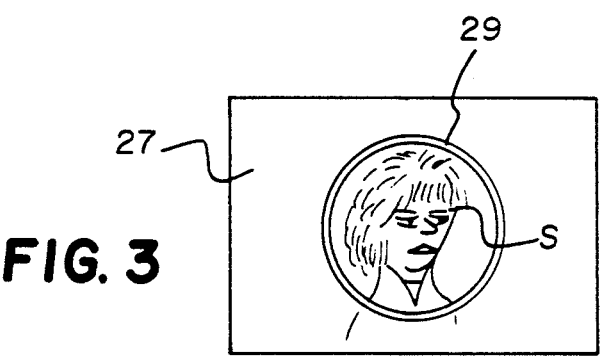
FIG. 3 is a front elevation view of a focusing circle of the close-up attachment showing the position of a subject (to be photographed) relative to the circle when the subject-to-camera distance is correct for proper lens focus.
Figure 4:
FIG. 4 is a front elevation view, similar to FIG. 3, showing the position of the subject relative to the focusing circle when the subject-to-camera distance is less than the correct distance.
Figure 5:
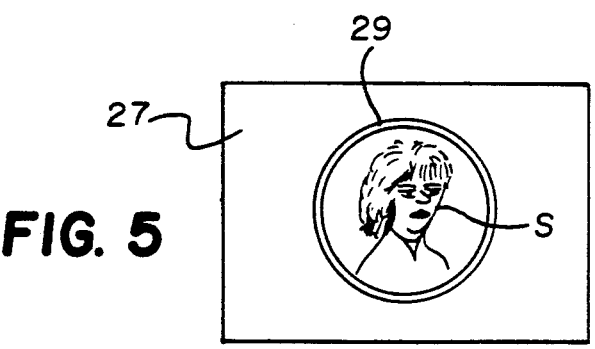
FIG. 5 is a front elevation view, similar to FIG. 3, showing the position of the subject relative to the focusing circle when the subject-to-camera distance is greater than the correct distance.

As shown in FIGS. 1 and 3, the front finder lens 27 includes a printed or molded fixed-focusing circle 29. When a close-up image of the subject S appears just within the circle 29 as shown in FIG. 3, the camera-to-subject distance is correct for proper lens focus. When the close-up image of the subject S appears partly outside the circle 29 as shown in FIG. 4, the camera-to-subject distance is less than the correct distance. When the close-up image of the subject S appears remotely within the circle 29 as shown in FIG. 5, the camera-to-subject distance is greater than the correct distance.

The invention has been described with reference to a preferred embodiment. However, it will be appreciated that variations and modifications can be effected within the ordinary skill in the art without departing from the scope of the invention. For example, a conventional hot-shoe for an electronic flash unit can be provided on the stabilizer piece 23. In this instance, of course, suitable known means would have to be included in the single-use camera 1 for electrically connecting the hot shoe to flash/shutter synchronization contacts. According to another example, in place of the close-up lens 19 and the front and rear finder lenses 27 and 28, other accessory means could be used such as filters, etc.

We claim:

1. An accessory attachment for use during picture-taking with a camera which has an open viewfinder tunnel, is characterized in that:
   attachment means is configured to be manually inserted into the open viewfinder tunnel for securing itself substantially immovably to the camera; and
   accessory means is connected to said attachment means for use during picture-taking when the attachment means is secured to the camera.

2. An accessory attachment as recited in claim 1, wherein said attachment means includes a plug-like insert sized and shaped to substantially fill the open viewfinder tunnel when the attachment means is secured to the camera.

3. An accessory attachment as recited in claim 2, wherein said attachment means includes a stabilizer piece connected to said plug-like insert to provide a relatively narrow space between said stabilizer piece and the insert for locating the stabilizer piece along the exterior of the camera when the insert is located in the viewfinder tunnel.

4. An accessory attachment as recited in claim 1, wherein said accessory means includes a supplementary taking lens and a corresponding finder lens located to be positioned respectively in front of a main taking lens of the camera and the open viewfinder tunnel when said attachment means is secured to the camera.

5. An accessory attachment for use during picture-taking with a camera which has an open viewfinder tunnel, is characterized in that:
   attachment means is configured to be manually inserted into the open viewfinder tunnel for securing said attachment means is a fixed substantially immovable relation to the camera, and to be manually removed completely from the viewfinder tunnel to separate the attachment means from the camera; and
   accessory means is connected to said attachment means for use during picture-taking only when the attachment means is secured to the camera.

6. A photographic combination of a single-use camera having an empty open-ended viewfinder tunnel, and an accessory attachment for use during picture-taking with said camera, is characterized in that:
   said accessory attachment includes attachment means configured to be manually inserted into an open end of said viewfinder tunnel for securing said attachment means in a fixed relation to said camera, and accessory means connected to the attachment means for use during picture-taking only when the attachment means is secured in the fixed relation to the camera.

* * * * *